(No Model.)

S. T. McDOUGALL.
OIL RESERVOIR FOR OIL STOVES, &c.

No. 287,557. Patented Oct. 30, 1883.

WITNESSES.
S. Baldwin Chapman
J. Thornton Callagan

INVENTOR.
Samuel T. McDougall.

UNITED STATES PATENT OFFICE.

SAMUEL T. McDOUGALL, OF BROOKLYN, NEW YORK.

OIL-RESERVOIR FOR OIL-STOVES, &c.

SPECIFICATION forming part of Letters Patent No. 287,557, dated October 30, 1883.

Application filed February 15, 1883. (No model.)

*To all whom it may concern:*

Be it known that I, SAMUEL T. McDOUGALL, a citizen of the United States, residing at Brooklyn, in the county of Kings and State of New York, have invented a certain new and useful Improvement in Oil-Reservoirs for Oil Stoves and Lamps; and I do hereby declare that the following is a full, clear, and exact description of the invention, reference being had to the accompanying drawings, forming a part of this specification.

My invention relates to improvements in reservoirs for oil stoves and lamps; and the objects of my improvement are, first, to provide a reservoir for stoves and lamps which will at all times convey the oil or other liquid used to the wick at the same point or place at the wick-tube, and thus equalize the flame; second, to provide means of showing the quantity of liquid in the reservoir and the amount consumed in a given time; third, providing means for holding non-conducting substances over the reservoir and around the wick-tubes, as hereinafter described.

Figure 1:
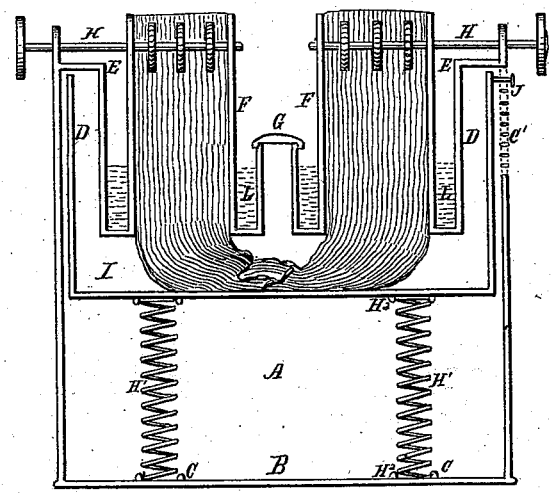
Figure 2:
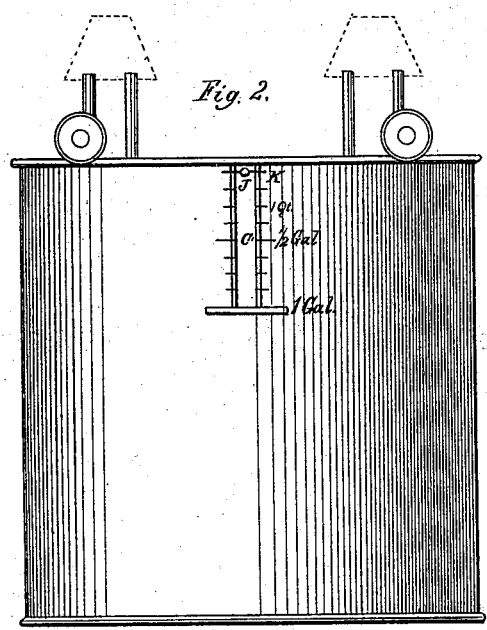

Figure 1 is a central vertical section of an oil-reservoir for oil stoves or lamps embodying my invention. Fig. 2 is a side view, showing the oil-indicator.

A, Fig. 1, is a metal vessel of any suitable size or shape. This vessel has a bottom, B. On this bottom, inside, two or more springs rest, as shown at C C. At one side, near the top, there is a slotted opening, C'. (Shown in Figs. 1 and 2.) The top of this vessel has a cover, E, extending inward a quarter of an inch, more or less, thence downward two inches, more or less, thence across, thus forming a cup-shaped cover, and leaving a space between the cover and the outer walls of the vessel A, as shown at D D. Out of the top of the cover E rise two or more wick-tubes, F F, and filler-tube G, made in the usual manner.

H H are spindles and wheels for raising and lowering the wicks, and are supported on the cover E, near the outer edge, or on the vessel A.

H' H' are springs between the outer and inner vessels. They are held in position by sockets or short tubes attached to the inside of the bottom B and the outside of the bottom of the vessel I, as shown at H² H², Fig. 1. These springs may be firmly attached at one end, or a single spring may be used. The wick-tubes are constructed in the usual manner, one end being attached to the depressed cover E, as shown.

I is a cup-shaped vessel for holding the oil or liquid used. This vessel I rests on the top of the springs H' H'. The upper edge of this vessel passes up and into the space D D, as shown.

At one side of the vessel I, near the top, is a pin, J. This pin passes out and through the slotted opening C', near the top of the vessel A. On the outer end of this pin is placed an index-hand, as shown in Figs. 1 and 2. The object of this pin and index-hand is to indicate on the graduated scale K the quantity of oil in the vessel I, or the amount consumed in a given time. The graduated scale or plate K is attached to or made on the outer vessel, A, at the slotted opening C', as shown in Fig. 2.

The dotted lines around the bottom of the wick-tubes and filler-tube represent a packing of plaster-of-paris, asbestus, or other non-conducting substance. The object of this packing is to prevent the heat passing to the oil, and is shown at L L, Fig. 1.

The vessel A may constitute a base for a stove by placing legs or feet under it.

The usual kettle-rest and cones can be placed or hinged on the top of the vessel A or cover E, thus forming an oil-stove.

The operation of my invention is as follows: Open the filler-tube G, leading to the inner vessel, I, and pour in the oil. The weight of the oil in the vessel I will force the springs down. As the oil is consumed the springs will force the oil-vessel up toward the base of the wick-tubes, always maintaining the oil at the base of the wick-tubes by its own gravity. The quantity of oil in the vessel I will be indicated by the index-hand on the pin J, and the graduated scale K on the outer vessel, A, as shown in Fig. 2.

The advantages of my invention are as follows: The flame is always maintained at the same height without turning up the wicks, as the surface of the oil does not recede from the point of combustion while being consumed. The quantity of oil in the inner vessel is at all times shown on the graduated scale. The quantity of oil consumed in a given length of time can also be shown, the form of the cover acting in a double capacity, forming a channel to receive the edges of the inner vessel, and also forming a receptacle for the non-conducting packing.

Having fully described my invention, what I desire to claim and secure by Letters Patent is—

1. The combination, in an oil-reservoir for oil stoves or lamps, of an inner and outer vessel, the outer vessel having wick-tubes attached to the top, the inner vessel resting on springs within the outer vessel, and controlled and operated by the gravity of the oil in the inner vessel, whereby a uniform height of oil is maintained at the wick-tubes, substantially as described.

2. The combination, in an oil-reservoir for oil stoves or lamps, of an inner and outer vessel, the outer vessel having a slotted opening at one side, near the top, with a graduated scale at the opening, the inner vessel having a pin projecting from one side, near the top, and passing out through the slotted opening in the outer vessel, the said pin having an index-hand on the outer end, whereby the quantity of oil in the inner vessel is indicated on the graduated scale, substantially as shown and described.

3. The oil-reservoir for oil stoves or lamps, consisting of an inner and an outer vessel, the cover of the outer vessel being depressed and forming a cup-shaped top to receive the non-conducting packing, and a channel between the depressed portion of the cover and the outside of the vessel to receive the upper edge of the inner vessel, substantially as described.

4. In an oil-reservoir for oil stoves or lamps, the combination of the following parts: the outer vessel, A, with its graduated scale K, depressed cover E, channel D, wick-tubes F, filler-tube G, wick-raiser H, non-conducting packing L, and springs H' H', with the inner vessel, I, with its index-hand and pin J, substantially as shown and described.

SAMUEL T. McDOUGALL.

Witnesses:
S. BALDWIN CHAPMAN,
T. THORNTON CALLAGAN.